Aug. 5, 1969  W. C. SUSOR ETAL  3,459,271
COMPUTING WEIGHING SCALE SYSTEM
Filed Oct. 12, 1967  3 Sheets-Sheet 1

INVENTORS.
WILLIAM C. SUSOR
ROBERT E. BELL
Thomas H. Grafton
ATTORNEY

Aug. 5, 1969  W. C. SUSOR ET AL  3,459,271
COMPUTING WEIGHING SCALE SYSTEM
Filed Oct. 12, 1967  3 Sheets-Sheet 3
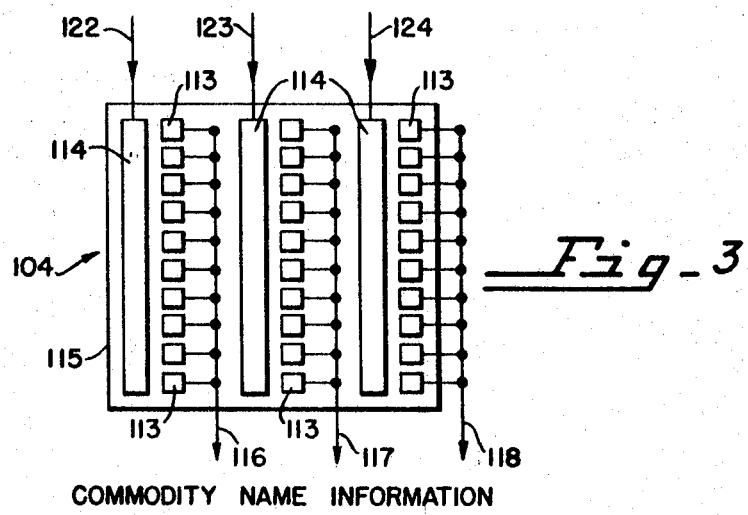
COMMODITY NAME INFORMATION
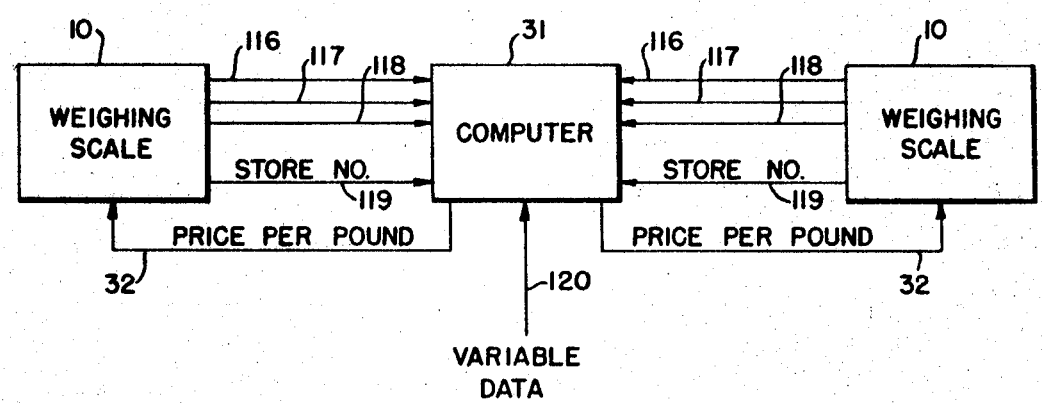
INVENTORS.
WILLIAM C. SUSOR
BY ROBERT E. BELL
Thomas H. Grafton
ATTORNEY United States Patent Office 3,459,271
Patented Aug. 5, 1969

3,459,271
COMPUTING WEIGHING SCALE SYSTEM
William C. Susor and Robert E. Bell, Toledo, Ohio, assignors, by mesne assignments, to The Reliance Electric and Engineering Company, Toledo, Ohio, a corporation of Ohio
Filed Oct. 12, 1967, Ser. No. 674,826
Int. Cl. G01g 23/38
U.S. Cl. 177—3         6 Claims

ABSTRACT OF THE DISCLOSURE

The disclosure describes a weighing scale system which includes a plurality of electrical or electronic computing scales. Each scale comprises a computer for multiplying the weight of a commodity upon the scale by a selected unit price factor. The weighing scales may be located in several widely separated areas in a city where the unit price of a commodity may vary according to the location. Additionally, the unit price may vary according to the commodity grade (Australian beef for hamburger may be priced differently from United States beef for hamburger), date (steak may be priced higher on Friday payday than on Monday), current inventory, etc. Each scale also includes a set of commodity name printing plates for printing on a label the name of the commodity being packaged and for providing commodity name information to a centralized computer. The centralized computer selects the unit price for each scale, when the respective commodity name printing plate is changed in accordance with the particular commodity name and in view of the respective scale location and variable data such as the foregoing commodity grade, date and inventory, and sets the unit price factors in each of the scale computers.

---

The invention relates to electrical and electronic computing weighing scale systems of the type used in prepackaging food for sale in retail food stores.

U.S. Patent No. Re. 25,897 issued Nov. 9, 1965, to Robert E. Bell discloses a computing weighing scale having a computer which calculates the money value of a package of goods according to the weight of that particular package and a selected unit price factor, and the scale prints a ticket, label or the like bearing thereon such money value and such selected price together with the net weight, date, store code, commodity name, and commodity grade. The name of the commodity is printed by commodity printing means, such as the type on a printing plate, and the printing means is set up by commodity name means, such as the printing plate. The commodity name means functions additionally to set the unit price factor in the computer. In operation, the supervisor in a pre-packaging operation changes coded elements on the printing plates from day to day according to the current price list. From then on, the unit price is set up automatically by changing the printing plates.

In large cities a food chain may have many retail stores selling commodities with prices which vary from store to store and from day to day because of the foregoing variable factors. The weighing scale system of the invention includes a single centralized computer for a plurality of computing scales each of the type disclosed in the foregoing patent. The commodity name printing plates in the scales provide commodity name information for the centralized computer which selects the unit prices from its memory and enters the unit price in each scale. The centralized computer, hence, is a data storage device which selects each particular unit price in accordance with its commodity name address and the foregoing variable factor addresses.

In the prior system shown in the foregoing patent, the commodity name printing plates in each store must have their coded elements changed every time the respective prices change. In the system of the invention, the coded elements never need to be changed since they simply provide commodity name information for the centralized computer. One centralized computer can select and set the unit price factors in all the computing weighing scales that conceivably would ever be included in one food chain's system in a large district or city such as New York as fast as the commodity name printing plates are changed in the food chain's stores, provided the telephone lines connecting the scales to the centralized computer are not busy as hereinafter described.

U.S. Patent No. 3,291,232 issued Dec. 13, 1966 to Robert E. Bell discloses the same computing weighing scale as is disclosed in the above patent, No. Re. 25,897. The name of the commodity is printed by commodity printing means, such as the type on a printing plate, and the printing means is set up by commodity name means, such as the printing plate. The commodity name means functions additionally to provide commodity name information for data logging means such as a computer or a tape punch which logs weight and computed value data. For example, a data logging computer lists and adds the number of pounds and the retail value of all the rib steaks processed by the weighing scale system in an eight hour period, or a data logging tape punch lists such data on a tape which is mailed to a centralized computer for totalizing. The unit price is selected by means of manually operable knobs or levers connected to selector switches.

In the prior system shown in the foregoing U.S. Patent No. 3,291,232, the commodity name printing plates have coded elements which provide commodity name information for data logging means. Unit price is set in the weighing scale by the manually operable knobs or levers. This is unsatisfactory because it takes time, requires certain interlock circuitry, and operators make mistakes in setting the knobs or levers. In the system of the invention, the centralized computer eliminates the need for resetting the price knobs or levers in all of the scales which are connected to the centralized computer every time a different commodity is to be weighed or every time a unit price changes.

The centralized computer in the system of the invention is described as being connected directly to two computing weighing scales for the sake of simplicity. In actual practice, data transmission is accomplished by means of telephone lines. As described in "The Bell System Technical Journal," vol. 39, pp. 431–476, published May 1960, data transmission services are provided on a private line basis by adapting telephone facilities to particular data service requirements. In the Bell System this service concept is called "Data-Phone" which is a trademark of the American Telephone and Telegraph Company identifying Bell System equipment. Most computers have an input available for a telephone set or can be adapted for such an input. As described in the above Bell System article, a regular telephone call is made to establish a connection between two points. Operation of a pushbutton associated with the telephone set at each end of the connection disconnects the telephone instruments and connects data subsets to the telephone lines. The subset, depending upon the type, accepts analog or digital (usually binary) information at the transmitting end and, if necessary, modulates the signal to a frequency suitable for use over telephone circuits. At the receiving end the data subset demodulates the line signal and feeds the information to the computer. In

3 reverse, the computer provides information for the scales.

In the system of the invention, the particular centralized computer needs a particular code and the data subset at the computer which may be located in the food chain's warehouse and office building receives commodity name and store number information from such subset in such particular code and in turn provides coded unit price information for such subset. This subset is connected by the telephone lines to the subsets in the retail stores. If a store has more than one computing weighing scale, all of such scales are connected to the store's single subset. The inputs from and the outputs for the scales are made compatible to the subset. U.S. application Ser. No. 535,760, filed Mar. 21, 1966, in the name of William C. Susor shows and describes a computing weighing scale having photocells for reading coded commodity name printing plates and producing 1–2–4–8 binary coded decimal output signals (unit price signals).

In operation, after a commodity name printing plate change in a scale, the operator makes a regular telephone call, and the pushbuttons at each end of the connection are operated to disconnect the telephone instruments and to connect the data subsets for the data transmission first to the centralized computer (commodity name and store number information) and then from the centralized computer (unit price information).

The objects of this invention are to improve computing weighing scale systems, to provide automatically operable means for setting unit price factors into computing weighing scales, and to provide centralized computing or data storage means which is operatively connected to a plurality of electrical or electronic computing weighing scales for selecting price factors in accordance with commodity names and setting the price factors into each of the computing weighing scales.

The above and other objects and features of this invention will be appreciated more fully from the following detailed description when read with reference to the accompanying drawings wherein:

FIG. 3 is a plan view of a switchboard which is operated by one of the plates illustrated in FIG. 2; and FIG. 4 is a block diagram illustrating a centralized computer which is coupled to two scales, one of which is shown in FIG. 1, to receive commodity name and store number data from such scales and to provide unit price factors for the scales.

Figure 1:
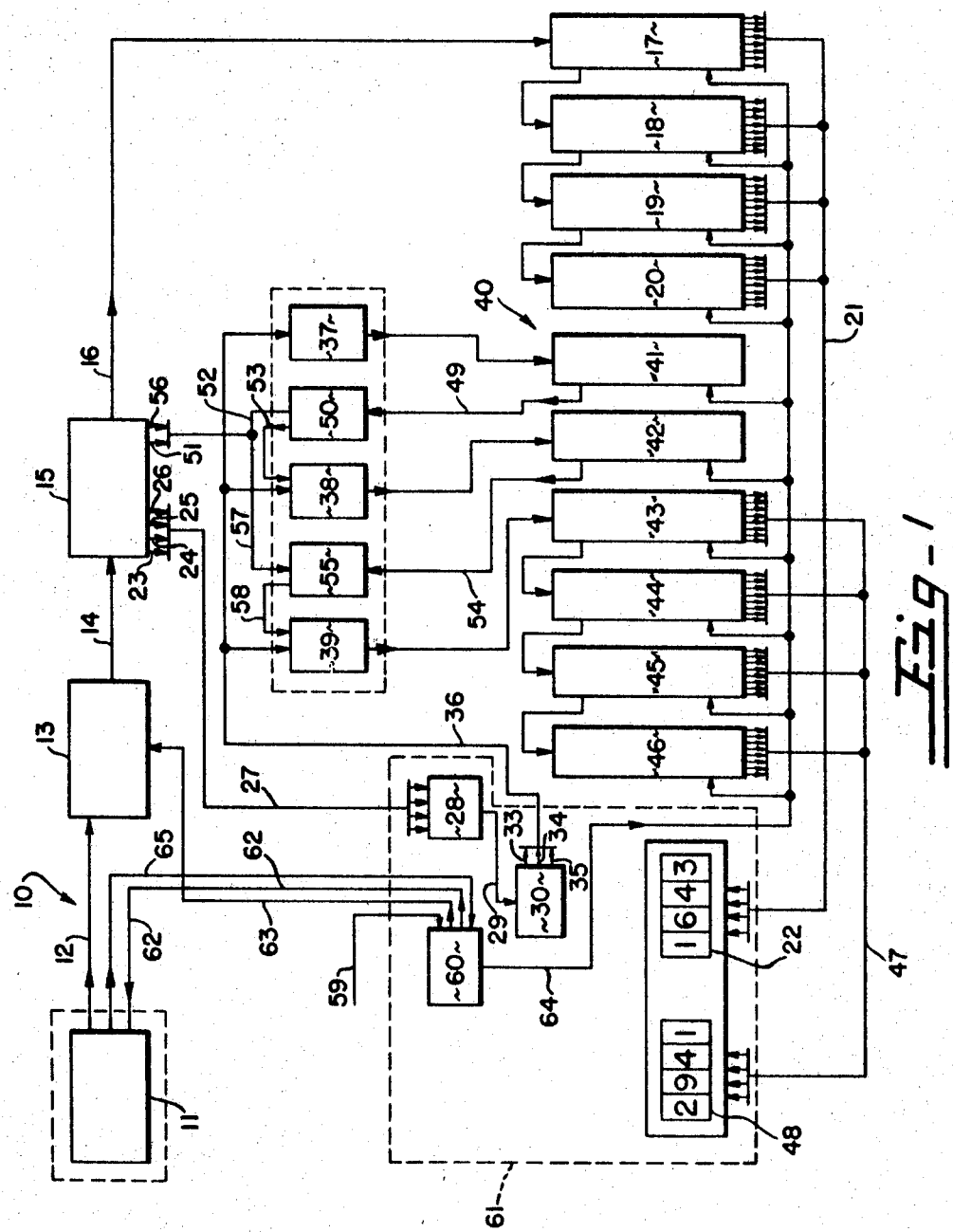
FIG. 1 is a schematic block diagram illustrating the general organization of a weighing scale and mechanism for reading the scale and indicating such reading in digital form and also multiplying such reading by an arbitrarily selected factor and indicating the product.
Figure 2:
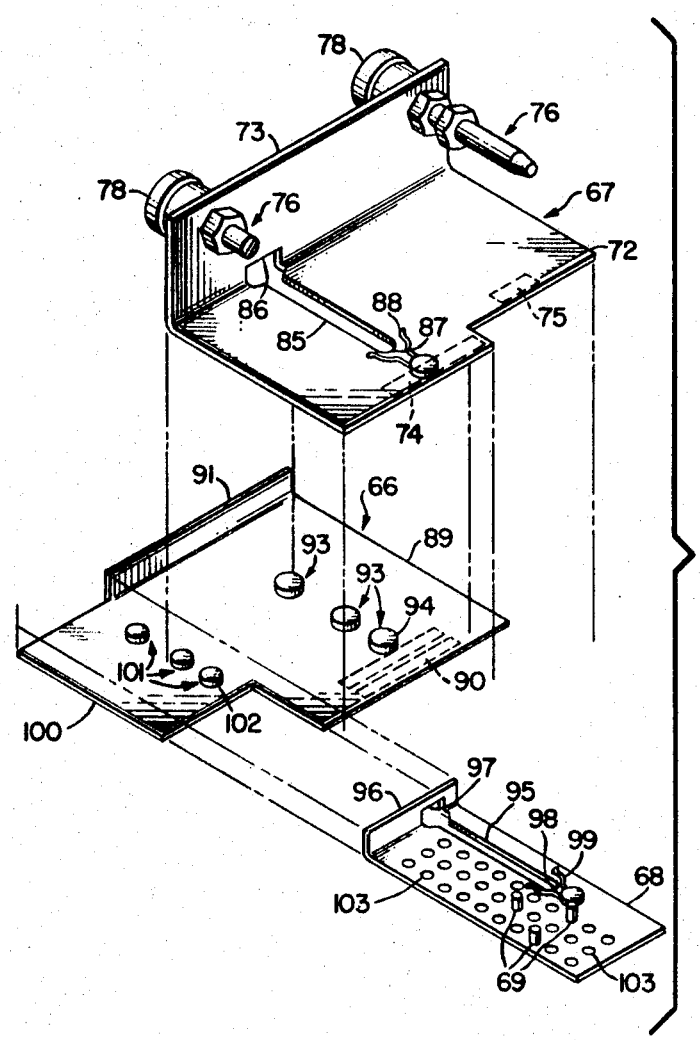
FIG. 2 is an exploded view in perspective of three plates two of which print the name and grade of the commodity being processed by the weighing scale shown in FIG. 1 and another which furnishes commodity name information for the computer shown in FIG. 4.

Referring to the drawings, each of the computing weighing scales 10 (FIGS. 1 and 4) includes a scanner or hearing device 11 that is adapted to generate a series of pulses proportional in number to the numerical value of the reading. The computing weighing scale 10 (illustrated in simplified form in FIG. 1) including weighing means, computing means and means for reading out the computer and the scanner 11 is shown in detail in U.S. Patent No. 3,055,585, issued Sept. 25, 1962, in the names of R. E. Bell et al. These pulses are generated as independent, successive wave trains or trains of pulses and either may be generated continuously, i.e., one pulse train following the other after a short interval of time, or they may be generated in response to a starting or interrogating signal. An interrogating signal may be a demand made by a start button or other control for the reading device to execute a reading cycle.

The pulses generated in the reading device 11 are transmitted over a line 12 to a pulse shaper and wave train

4 identifying mechanism 13 which in turn transmits pulses of sharp definite wave form over a line 14 to a multiplier pulse generator 15. The multiplier pulse generator 15 is used only in those installations or combinations where it is desired to indicate and/or record the product of the weight reading of the weighing scale times a selected price factor. The pulse generator 15 delivers to the counter lead 16 one pulse for each pulse received on the line 14. These pulses on the counter lead 16 are fed to a first decade 17 of a modified binary type counter which is composed of four decades including the decade 17 and other decades 18, 19, and 20 adapted to register the units, tens, hundreds, and thousands places of the indication read by the reading device 11. The maximum counting and indicating capacity of the counter composed of the decades 17, 18, 19 and 20 is 9,999 counts. It should be realized that the units, tens, hundreds and thousands may represent decimal fractions as well as whole numbers and that a small weighing scale, for example, could be read to a thousandth of a weight unit, either pound or kilogram, or if larger and read to a hundredth of a unit, could indicate up to 99 units. At the completion of a weight reading by the reading device 11, the count accumulated in the counter comprising decade 17 to 20, inclusive, is transmitted through an output cable 21 which includes a plurality of leads from each counter decade. The voltages transmitted through the cable 21 are transmitted to an indicating or recording device 22 which may provide on dials or number wheels a direct digital indication of the count and may also be arranged to position printing wheels so that printing impressions may be made directly from the indication. The indicating device 22 including gear means for setting up printing type wheels is shown and described in detail in U.S. Patent No. 2,759,672, issued Aug. 21, 1956, to C. S. Simonds et al.

The pulse generator 15 generates a predetermined number of voltage pulses for each received pulse and is arranged to provide for each pulse on the line 14 an output of two pulses on an output line 23, four pulses on an output line 24, two pulses on an output line 25, and one pulse on an output line 26. These are transmitted through a cable 27 to a diode switching matrix or combining network 28 referred to as a diode matrix. The pulses transmitted through the cable 27 into the diode matrix 28 are combined therein to energize a set of nine leads appearing in a cable 29 which the first lead carries a single pulse for each voltage pulse supplied to the pulse generator 15, a second carries two pulses, a third three, and so on up to nine. These leads are connected to three selector switches included in a multiplier setting device 30 and settable by a centralized computer 31 (FIG. 4), connected to the switches through a cable 32 (FIG. 4). Selector switches 19a shown in the above U.S. Patent No. Re. 25,897 are set mechanically by means of coded pins on commodity name printing plates. Similar eselector switches are used in the system of the invention with the centralized computer selecting the contacts to be closed electrically rather than mechanically by the coded pins shown in the patent. Any suitable means can be used to select the leads in the cable 29 and connect them to output leads 33–35 in accordance with the unit price determined by the centralized computer 31.

Leads 33–35 are carried through a cable 36 to combining amplifiers 37, 38, and 39 which transmit the pulses from the multiplier setting device 30 to corresponding decades of an electronic counting means 40 arranged to count the pulses representing the computed amount and comprising decades 41, 42, 43, 44, 45, and 46. In the example shown in FIG. 1, the weighing scale has a capacity suitable for retail use in which the minimum graduation is one one-hundredth of a United States unit of weight. Likewise, the multiplier set into the multiplier setting device 30 may be a price represented by dollars, dimes and cents. Since the minimum monetary unit to be indicated is the cent, the first two decades of the amount-counting means or counter 40, i.e., the decades 41 and 42 which count the hundredths and tenths of cents, respectively, appearing in the product, are not connected into an indicating device but merely accumulate these fractional portions of a cent and transmit the accumulated portion into the next higher decade of the counting means 40.

The voltages in the decades 43 to 46, inclusive, representing the cents, dimes, dollars and tens of dollars of the computed amount or product are transmitted through a cable 47, containing eight leads for each decade, to an amount indicator 48, which like the indicating device 22 is shown and described in detail together with gearing for setting up printing type wheels in the foregoing noted U.S. Patent No. 2,759,672.

Since pulses are being transmitted from the pulse generator 15 through the diode matrix 28 and multiplier setting device 30 simultaneously to the leads 33, 34, or 35 and since these pulses are transmitted through the amplifiers 37, 38, and 39 into the counter decades 41, 42, and 43 simultaneously it is necessary, to prevent error, to delay any carry pulse from one decade to a following or higher place decade until after the transmission of pulses through the amplifiers 37, 38, and 39. Since the only place where such error could occur is in the decades that are fed from the amplifiers 38 and 39, arrangements are made so that the carry pulse from the decade 41 is transmitted through a lead 47 to a storage circuit 50 where it is held until the receipt by such storage circuit 50 of a clearing pulse from the pulse generator 15 by way of output terminal 51 and lead 52.

The clearing pulse from the output lead 51 transmitted through the lead 52 occurs once for each pulse transmitted by the lead 14 but occurs later in time than the pulses transmitted to the diode matrix 28 and factor setting device 30. If during the counting of a group of pulses from the diode matrix 28 the counter 41 exceeds its capacity and provides a carry pulse on lead 49, such pulse is stored and then transmitted upon receipt of the clearing pulse to the next amplifier 38 by way of lead 53 and then through such amplifier 38 into the next decade 42 of the amount counter 40. Likewise, carry pulses from the decade 42 are transmitted through a lead 54 to a second storage circuit 55. The carry circuit 55 thus is triggered or conditioned to transmit a pulse whenever it receives a carry pulse from the decade 42 and transmits such pulse upon the receipt of a clearing pulse received from output terminal 56 and transmitted through lead 57. Upon the receipt of the pulse from the output terminal 56 which occurs one unit of time, where a unit of time is the time spacing between pulses from the multiplier 15, after the pulse on the output terminal 51, the carry storage circuit 55, if conditioned by a carry pulse from the decade 42, transmits a pulse over a lead 58 to the combining amplifier 39 and thence to the counter decade 43.

The sequence of timing of the pulses from the pulse generator 15 is such that the output lead 23 transmits the first two pulses generated within the generator occurring during the first two units of time, the output lead 24 transmits the next four pulses occurring on the next four increments of time while the output lead 25 transmits the next two pulses occurring during the next two increments of time while the lead 26 transmits a single pulse occurring at the ninth unit of time. Next, the output terminal 51 transmits the tenth pulse and the output terminal 56 the eleventh pulse these occurring at generally equal intervals of time following the other pulses. The time spread between the pulses is sufficient so that, when a carry has occurred and such carry is stored in the carry storage circuit, for example, the circuit 50, the carry circuit may be tripped or energized by the pulse on the lead 51 and feed its pulse through the amplifier 38 into the decade 42 in time to clear that decade if it has counted to nine and is ready to transmit a carry pulse and have that carry pulse transmitted and stored in the carry circuit 55 in time to be transmitted by triggering by a pulse from lead 56, so that the second circuit carry is accurately effected regardless of the particular condition in the electronic counting means.

In the operation, after a load is placed on the weighing scale a start signal is provided on a lead 59, which signal is transmitted to a sequence control 60 included in the reading station 61. The reading station 61 includes all of the structure enclosed in the dotted line including the indicators 22 and 48, the multiplier setting device 30, and the diode matrix 28. Upon receipt of the start signal on the line 59 the sequence control 60 transmits a pulse or signal over an output lead 62 leading to the reading device 11 causing it to start a scan. At the same time an unblocking signal is transmitted over a lead 63 to the amplifier and shaper stage so that this stage may transmit the pulses picked up from the reading device 11 and transmit them as properly shaped pulses over the lead 14 to the multiplier pulse generator 15.

Meanwhile, upon the receipt of the start signal on the lead 59 a reset signal is transmitted over lead 64 to each of the counter decades so as to set all of these decades to zero count in anticipation of the next reading. The one exception to the resetting to zero is the counter decade 42 of the amount counter which, in order to round off the nearest cent in value, is preset to a value of five representing a half cent. Therefore, as soon as a half cent or any number of cents plus a half cent has accumulated the cents counter decade 43 indicates the next cent in value thus rounding off the amount to the nearest cent.

Upon the receipt of an end of scan signal which may be transmitted over a lead 65 from the reading device 11 to the sequence control 60, the sequence control 60, through leads not shown in FIG. 1 energizes the visual indicating devices 22 and 48 so that they immediately scan the condition of the counter stages and position the indicating and printing wheels to positions corresponding to the counts then accumulated in the counter. Since this occurs after the end of the reading scan and since the electronic counters, both the weight indication counters 17 to 20 inclusive and the amount indication counters 43 to 46 inclusive, have reached their final indicating condition, the mechanical indicators 22 and 48 are ready to scan such counters and position themselves according to the indicated amounts.

Briefly, the reading device 11 generates a series of pulses one for each unit of weight. These pulses after proper shaping are transmitted through the pulse generator 15 which delivers a fixed number of pulses on each of several of a plurality of leads for each received pulse. That output lead of the pulse generator which transmits the last pulse generated therein is connected to the electronic counter comprising decade 17, 18, 19, and 20 adapted to count the actual number of pulses transmitted from the reading device 11. The pulse is taken from the last stage of the pulse generator rather than the input lead 14 as a safety feature because, when so connected, there can be no indication of either weight or amount unless the pulse generator 15 is functioning properly.

The pulses, i.e., the fixed number of pulses generated in the pulse generator 15 for each pulse in the series of pulses from the reading device 11, are transmitted through the combining matrix 28 to the selector switches in the factor setting device 30 and the selected pulses constituting a predetermined number are transmitted through the amplifiers connected to the first few decades of the amount counter 40. These are totaled in the amount counter 40 which, with indicator 48, indicates the product of the reading of the condition responsive member as read by the reading device 11 and multiplied by the selected price factor set into the factor setting device 30.

The computing weighing scale is constructed as a unit with printing apparatus which is shown and described in patent No. 3,122,995 issued Mar. 3, 1964, in the names of C. E. Adler and F. C. Carroll. The scale and the printing apparatus weigh commodities and issue a printed ticket, label or the like bearing thereon the net weight, price per pound, and computed value of a weighed commodity together with such variable data as the date, store code, commodity name, and commodity grade. Printing type wheels in the printing apparatus are set up by the above noted gearing connected to the indicating devices 22 and 48 for printing the weight reading shown as in example in FIG. 1 as 16.43 pounds on the indicating device 22 and for printing the value reading (weight times the price factor set into the factor setting device 30) shown as an example in FIG. 1 as $29.41. The commodity name and grade are printed from printing plates 66 and 67, respectively, as shown and described in U.S. Patent No. 2,953,989 issued September 27, 1960, in the name of T. W. Gittus.

The centralized computer 31 may be an electronic digital computer of the type disclosed in the above U.S. Patent No. 3,291,232 (see FIG. 8 in the patent). Commodity name information is furnished by means of a detachably mounted plate 68 carrying pins 69 in a coded arrangement. The plates 66–68 are exactly like their counterparts shown in U.S. Patent No. 3,291,232 being shown in FIGS. 3, 4 and 6 in such patent in their operative positions at a printing station. Plates 66–68 are mounted in their printing station in the weighing scale 10 in the same manner.

Printing plate 67 functions both as a printing means and as a holder for the other printing plate 66; it includes a flat printing plate supporting portion 72 a part or edge 73 of which is bent or turned up out of the plane of the supporting portion 72. The bent part 73 of the printing plate 67 which is the front portion of the plate, functions as a place to put identification indicia which correspond to the printing type 74 carried by the supporting portion 72 of the printing plate. These type 74 can be made, for example, of rubber, metal or plastic and can be formed integrally with the plate or made separately and attached by means of an adhesive and are used to print the grade of beef being prepacked, such grades being U.S. Prime, Choice, Good, Utility and Commercial. For commodities, such as cheese or luncheon meat, which are not graded the area on the plate occupied by the type 74 is left blank. Hence, six of the printing plates 67 are needed for a complete set, five for the five grades of beef and one for the blank, and are termed "commodity grade printing plates." The commodity grade printing plates 67 also carries type 75 for printing a store code. The bent part or front portion 73 of the printing plate 67 also functions as a support for a pair of locating and latch pins 76 each of which includes a portion which extends through the front portion 73 of the printing plate 67 to receive a knob handle 78.

The commodity grade printing plate 67 which functions additionally as a holder for the commodity name printing plate 66 is provided with a slot 85 which extends from the front portion 73 of the plate 67 toward the printing type 74 on the plate, the slot 85 being transverse to such type 74 and having an enlarged open end 86 at the front portion 73 and a closed end 87 remote from the front portion 73. A spring clip or keeper 88 is secured to the type bearing portion 72 of the plate 67 at the closed end of the slot with its open mouth facing the slot, the spring clip 88 being on the upper surface of the type bearing portion 72 and the type 74 being on the lower surface of the type bearing portion 72.

The printing plate 66 includes a flat portion 89 bearing type 90 for printing the commodity name a minor part or front portion 91 of which type bearing portion is bent out of the plane of the type bearing portion and which is suitable for use as a handle and as a place to put identification indicia corresponding to the type 90. Three shouldered guide and lock pins 93 are carried by the upper surface of the type bearing portion 89 of the printing plate, the lower surface of the type bearing portion 89 being the surface on which the type 90 are located, in a straight row which extends transverse to the front portion 91 of the plate and to the type 90 on the plate.

The plate 68 is inserted in the holder 67 by inserting the first one of the pins 93 in the enlarged open end 86 of the slot 85 and then the other two of the pins until such first pin contacts the closed end 87 of the slot. The edges of the printing plate 67 along the slot 85 fit snugly between the shoulders on the pins 93 and the upper surface of the type bearing portion 89 of the printing plate 66. A head 94 on such first one of the pins 93 expands the spring clip 88 as it approaches the closed end 87 of the slot 85, the clip resiliently returning to its original position to embrace the head 94 when the printing plate 66 is inserted fully in its holder 67 to retain the plate 66 in the holder in a readily removable condition. In the inserted position, the type 90 on the printing plate 66 are juxtaposed to the type 74 on the holder or commodity grade printing plate 67 in an accurately located position, the type 74 printing the grade of the beef being prepackaged and the type 90 printing the name of the cut of the beef being prepackaged. Hence, the printing plate 66 is termed "commodity name printing plate." The commodity name printing plate 66 can be readily removed from the printer either by sliding it out of the slot 85 in the commodity grade printing plate or holder 67 or by removing the holder 67 from the printer.

In operation, in processing a side of beef, a commodity grade printing plate or holder 67 is chosen which corresponds to the grade of the beef being processed. The type 74 carried by the holder print the grade of the beef, the holder being left in the printer as long as the grade of the beef being prepackaged remains unchanged. Commodity name printing plates 66 are substituted one for the other in the holder 67 in operative positions accurately located, by means including the closed end 87 of the slot 85 in the holder, relative to the printing station as the various cuts of beef are prepackaged. Type 90 carried by the printing plates 66 print information of a second kind, i.e., the names of the cuts of beef. Since the commodity name plates 66 are readily detachable from the holder 67, a relatively large number of combinations of the two kinds of information can be printed from a relatively small number of printing plates.

In processing commodities which do not have grades, such as cheese and luncheon meat, a holder 67 is chosen which does not carry printing type, i.e., it is a blank. Commodity name printing plates 66 are substituted one for the other in the holder 67 as the various commodities are prepackaged.

The plate 68 is provided with a slot 95 which extends from a bent-up front portion 96 of the plate 68, the slot 95 having an enlarged open end 97 at the front portion 96 and a closed end 98 remote from the front portion 96. A spring clip or keeper 99 is secured to the plate 68 at the closed end of the slot 95 with its open mouth facing the slot, the spring clip 99 being on the upper surface of the plate 68.

The printing plate 66 includes a flat extension 100 carrying three shouldered guide and lock pins 101 on its upper surface in a straight row extending transverse to the front portion 91 of the plate. The plate 68 is inserted or clipped in the commodity name printing plate 66 by inserting the first one of the pins 101 in the enlarged open end 97 of the slot 95 and then the other two of the pins until such first pin contacts the closed end 98 of the slot. The edges of the plate 68 along the slot 95 fit snugly between the shoulders on the pins 101 and the upper surface of the plate extension 100. A head 102 on such first one of the pins 101 expands the spring clip 99 as it approaches the closed end 98 of the slot 95, the clip resiliently returning to its original position to embrace the head 102 when the plate 68 is inserted fully to retain the plate 68 in a readily removable condition.

The operator by inserting a commodity name printing plate 66 into the scale 10 sets up the printer to print the commodity name by means of the type 90 and provides by means of the pins 69 the commodity name information for the centralized computer 31.

The pins 69 are switch operators and are arranged in holes 103 in the plate 68 in a pattern in accordance with the name of the commodity printed by the plate 66. There are three straight, parallel rows of the holes 103. Each row has ten holes and extends transverse to the front plate portion 96. The hole 103 in each of the rows most remote from the front plate portion 96 is the number one hole, the hole next adjacent the number one hole in each of the rows is the number two hole, etc. The last hole in each of the rows is used for zero. Conceivably, the switch operators could be constructed in other ways; for example, instead of pins set in holes, tabs could be bent up out of the material of the plate 68 itself in a particular pattern.

The pins 69 operate three selector switches 104 (FIG. 3) by moving brushes which are not shown but which are shown in the above U.S. Patent No. 3,291,232. Each of the three selector switches 104 includes a straight row of ten contacts 113 and a common strip contact 114 mounted on a switchboard 115. The contacts in each of the three sets of contacts 113 are connected by means of cables 116–118, each carrying ten wires one for each of the contacts, to the centralized computer 31. Common contacts 114 are connected to input leads 122–124 that are connected to any suitable electrical source.

The contacts in each of the three sets of contacts 113 are used to furnish commodity name information to the centralized computer 31. For example, the contacts in the first set of contacts 113 (vertical row) can relate to dairy products, poultry, pork, beef, etc.; the contacts in the next set of contacts 113 can relate to meat cuts such as roasts, steaks, etc.; the contacts in the last set of contacts 113 can relate to meat cuts such as rib, sirloin, etc. As a specific example, the bottom three contacts 113 can relate to "Beef," "Steak" and "Sirloin," respectively. The pins 69 are then arranged in the holes 103 in the plate 68 carried by the "Sirloin Steak" commodity plate 66 so that when the commodity plate 66 is inserted into operative position in the printer the bottom three contacts 113 are closed. This completes a circuit from the common contacts 114 to the engaged ones of the contacts 113 producing a hot address wire in each of the cables 116–118 which are connected to the computer 31. Similarly, an additional switch 104 (not shown) is provided to furnish the respective store numbers to the centralized computer 31 through a cable 119, one for each store.

Variable data, such as commodity grade, date and current inventory, are furnished the centralized computer through an input 120.

The weighing scale system includes a plurality of computing weighing scales 10 each including a computer (FIG. 1) for computing the values of commodities according to their weight and price factors and commodity printing means (type 90) for printing the names of the commodities, centralized computing or data storage means 31 for selecting the price factors in accordance with the commodity names and setting the price factors in each of said computers, and commodity name means (plates 66 and 68) for both setting up the printing type and providing commodity name information for the centralized computing or data storage means.

Alternatively, the commodity names means (plates 66 and 68) sets up the printing type only. The operator looks at the front plate portion 91 which bears the identification indicia corresponding to the commodity name type 90 and operates the three selector switches 104 by hand in accordance with such indicia. The switches 104 can be operated by any suitable means, such as a pushbutton keyboard. The "Sirloin Steak" commodity plate 66, for example, might carry the number "125" on its front portion 91. By punching "125" into the keyboard, the "Sirloin Steak" commodity name information is provided for the centralized data storage means.

The weighing scale system also has means including cables 119 for entering data relating to the locations of the weighing scales into the centralized computing means, whereby the price factors are selected in accordance with said commodity names and said data. The weighing scale system also has means for entering data relating to commodity grade, current date, and current inventory into the centralized computing means, whereby the price factors are selected in accordance with said commodity names and said data.

It is to be understood that the above description is illustrative of this invention and that various modifications thereof can be utilized without departing from its spirit and scope.

Having described the invention, we claim:

1. A weighing scale system, comprising, in combination, a plurality of computing weighing scales each including a computer for computing the values of commodities according to their weight and price factors and commodity printing means for printing the names of the commodities, centralized means for selecting the price factors in accordance with the commodity names and setting the price factors in each of said computers, and commodity name means providing commodity name information for the centralized means.

2. A weighing scale system in accordance with claim 1 having means for entering data relating to the locations of the weighing scales into the centralized means, whereby the price factors are selected in accordance with said commodity names and said data.

3. A weighing scale system in accordance with claim 1 having means for entering data relating to the grade of the commodities into the centralized means, whereby the price factors are selected in accordance with said commodity names and said data.

4. A weighing scale system in accordance with claim 1 having means for entering data relating to the current date into the centralized means, whereby the price factors are selected in accordance with said commodity names and said data.

5. A weighing scale system in accordance with claim 1 having means for entering data relating to the current inventory of the commodities into the centralized means, whereby the price factors are selected in accordance with said commodity names and said data.

6. A weighing scale system in accordance with claim 1 wherein the commodity name means also sets up the commodity name printing means.

References Cited

UNITED STATES PATENTS

| 3,044,563 | 7/1962 | Gumpertz et al. | 177—3 |
| 3,291,232 | 12/1966 | Bell | 177—3 |

ROBERT S. WARD, JR., Primary Examiner

U.S. Cl. X.R.

177—25; 235—58